United States Patent
Izumi et al.

(10) Patent No.: US 6,836,580 B2
(45) Date of Patent: Dec. 28, 2004

(54) WAVELENGTH DISPERSION COMPENSATION SYSTEM FOR COMPENSATING EVEN FOR HIGHER-ORDER DISPERSION

(75) Inventors: Hirotomo Izumi, Sapporo (JP); Setsuo Yoshida, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 353 days.

(21) Appl. No.: 09/971,645

(22) Filed: Oct. 9, 2001

(65) Prior Publication Data

US 2003/0053737 A1 Mar. 20, 2003

(30) Foreign Application Priority Data

Jul. 4, 2001 (JP) ........................................ 2001-203204

(51) Int. Cl.[7] .............................................. G02B 6/26
(52) U.S. Cl. ............................. 385/15; 385/16; 385/18
(58) Field of Search ........................... 385/15, 10, 11, 385/39, 37, 31, 27, 18, 16, 9, 3, 47; 359/615, 633, 634

(56) References Cited

U.S. PATENT DOCUMENTS

| | | | |
|---|---|---|---|
| 5,838,849 A | 11/1998 | Shirasaki | 385/31 |
| 5,930,045 A | 7/1999 | Shirasaki | 359/577 |
| 5,969,865 A | 10/1999 | Shirasaki | |
| 5,969,866 A | 10/1999 | Shirasaki | 359/577 |
| 5,973,838 A | 10/1999 | Shirasaki | |
| 5,982,488 A * | 11/1999 | Shirasaki | 356/519 |
| 5,999,320 A | 12/1999 | Shirasaki | 359/577 |
| 6,301,048 B1 * | 10/2001 | Cao | 359/566 |
| 6,332,689 B1 * | 12/2001 | Shirasaki et al. | 359/868 |
| 6,441,959 B1 * | 8/2002 | Yang et al. | 359/495 |
| 6,522,450 B2 * | 2/2003 | Zenteno | 359/260 |
| 6,556,320 B1 * | 4/2003 | Cao | 398/65 |

* cited by examiner

Primary Examiner—Frank G. Font
Assistant Examiner—K. Cyrus Kianni
(74) Attorney, Agent, or Firm—Staas & Halsey LLP

(57) ABSTRACT

By connecting a plurality of VIPA type wavelength dispersion compensators, each compensating for wavelength dispersion of a different order by a plurality of optical circulators and sequentially inputting input light to each VIPA type wavelength dispersion compensator, light, even the higher-order wavelength dispersion of which is compensated for, is outputted as output light.

9 Claims, 15 Drawing Sheets

NORMAL DISPERSION

ABNORMAL DISPERSION

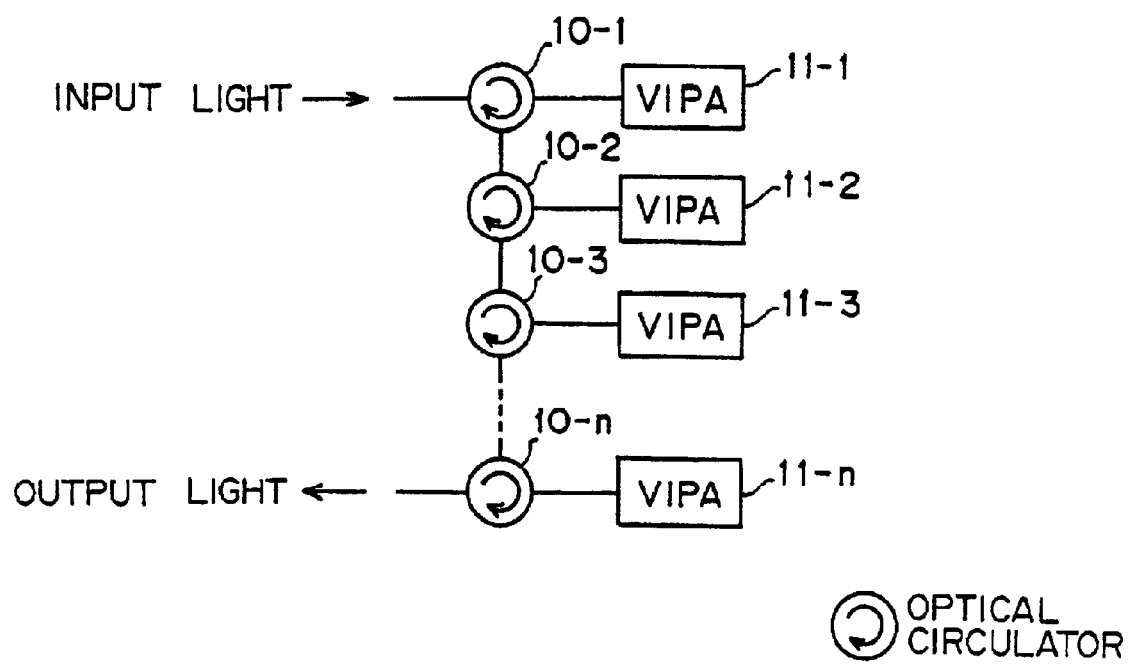
F I G. 14

WAVELENGTH DISPERSION COMPENSATION SYSTEM FOR COMPENSATING EVEN FOR HIGHER-ORDER DISPERSION

BACKGROUND OF THE INVENTION

1. Field of the Invention

The present invention relates to a wavelength dispersion compensation system for compensating even for higher-order dispersion.

2. Description of the Related Art

In optical communications, there is a great demand for a wavelength dispersion compensator for solving the problem that when an optical pulse is transmitted over a long distance, the signal transmitted over a long distance degrades.

FIG. 1 shows a conventional fiber-optical communications system for transmitting information by light.

In FIG. 1, a transmitter 1 transmits a pulse to a light receiver 6 through an optical fiber 2. However, the wavelength dispersion, which is also called "chromatic dispersion", of the optical fiber degrades the signals of the system. More specifically, the propagation velocity of a signal in an optical fiber depends on the wavelength of the signal due to wavelength dispersion. For example, the phenomenon that a pulse with a long wavelength (for example, a pulse 3 with a wavelength representing a red color pulse) propagates faster than a pulse with a short wavelength (for example, a pulse 4 with a wavelength representing a blue color pulse) is generally called "normal dispersion". Conversely, the phenomenon that a pulse with a short wavelength (for example, a blue color pulse) propagates faster than a pulse with a long wavelength (for example, a red color pulse) is generally called "abnormal dispersion". Therefore, in the case that a pulse 5, including both red and blue color pulses is transmitted from the transmitter 1, the pulse 5 is separated into the red and blue color pulses when the pulse 5 is transmitted through the optical fiber 2. The light receiver 6 receives the separated red and blue color pulses at respective different times. In this case, the case where the red color pulse propagates faster than the blue color pulse is "normal dispersion". For an example of other pulse propagation, if a pulse has consecutive wavelength components ranging from blue to red, the pulse is expanded in an optical fiber since the red and blue components propagate at different speeds, and is distorted due to the wavelength dispersion. Since all the pulses include limited numbers of wavelength range, such wavelength dispersion often occurs in fiber-optical communications. Therefore, to obtain a high transmitting power in a fiber-optical communications system, wavelength dispersion must be compensated for.

To compensate for chromatic dispersion, a diffraction grating pair, chirp fiber grating, dispersion compensation fiber and the like has traditionally been used to compensate for chromatic dispersion, in particular, the diffraction grating pair being not only for chromatic dispersion in a fiber. Japanese Patent Laid-open Nos. 10-534450 and 11-513133 have proposed a device, including a "Virtually Imaged Phased Array" (VIPA) as an inverted-dispersion component.

FIGS. 2A and 2B show the operation of a VIPA.

As shown in FIG. 2A, input light, including a plurality of wavelength components are collected by a cylindrical lens and are inputted to a VIPA plate. The inputted light is reflected a umber of times on reflection films provided on the each side of the VIPA while expanding. Light is outputted in small amounts from the VIPA plate during multi-reflection. The plurality of outputted light interfere each other and generate a plurality of parallel light rays propagate in different directions for each wavelength. The operation of this VIPA plate is understood as shown in FIG. 2B. In other words, since light is reflected a multiple number of times on a plurality of reflection planes on a VIPA plate, it can be virtually considered that light is outputted from a plurality of virtual images. Specifically, a plurality of light a to e are linearly arrayed. All the distances between the two virtual images are equal. Since it can be virtually considered that virtual images are phase-matched and arrayed, the component is named as a VIPA plate.

FIG. 3 shows a dispersion compensation system using a transmission type diffraction grating with the function equivalent to a VIPA plate.

How to compensate for dispersion is described later with reference to a VIPA plate. The operation of a transmission type diffraction grating is described here.

In a transmission type diffraction grating, stair-type steps are formed on the surface of a transparent material, and a plurality of light a to e are outputted from the surfaces of these steps. Since the plurality of light a to e are outputted after being transmitted over distances 1 to 5, respectively, there are phase differences between the plurality of light a to e after emission. After emission the plurality of outputted light a to e interfere with each other and generate a plurality of parallel light propagating in different directions for each wavelength. In a transmission type diffraction grating, a plurality of light a to e directly transmitted from a real light source are arrayed, while in a VIPA plate, a plurality of light a to e transmitted from virtual images are arrayed. However, the substantial operations of both the transmission type diffraction grating and VIPA plate are the same.

FIGS. 4 and 5 show the operational principle of a dispersion compensator using a VIPA plate.

FIG. 4 shows the appearance of a dispersion compensator using a VIPA plate. A plurality of light inputted from an optical fiber are converted into a plurality of parallel light by a collimation lens and are collected on a VIPA plate by a cylindrical lens. As described earlier, in the VIPA plate, a plurality of parallel light propagating in different directions for each wavelength are generated and outputted. The plurality of output light are collected on a mirror by a lens. The plurality of light inputted to the mirror are reflected in different directions and are inputted to the lens again. The plurality of light inputted to the lens are converted into a plurality of parallel light, are returned to the VIPA plate and are outputted to the cylindrical lens. The cylindrical lens generates a plurality of parallel light and inputs the plurality of parallel light to the collimation lens. The collimation lens collects the plurality of inputted parallel light and combines the plurality of parallel light in an optical fiber.

FIG. 5 shows a mechanism for compensating for wavelength dispersion by the configuration shown in FIG. 4.

As described earlier, a plurality of light outputted from a VIPA plate can be virtually regarded as a plurality of light outputted from virtual images a to d. For example, light outputted from a virtual image a (in this case, a real image) propagates toward a lens, is defracted by the lens and hits the surface of a mirror. The mirror reflects the inputted light in a different direction and inputs the light at a different position of the lens. The lens converts the inputted light into parallel light and returns to the VIPA plate. In this case, the light returned to the VIPA plate is inputted to a position different from the position from which the light is outputted initially. As shown in FIG. 5, it can be virtually considered that the light is returned to a different virtual image c. However, since virtual images a and c are separate from each other, the light is transmitted additional by distance 1 and is returned. Therefore, such transmitted light is returned with a delay caused by the extra transmission distance. Therefore, if a blue color pulse is delayed from a red color pulse due to wavelength dispersion, the propagation delay between the red and blue color pulses can be avoided by configuring the system so that the red pulse is transmitted along the route shown in FIG. 5 and delaying the propagation of the red pulse. The propagation time can also be reduced by configuring the system so that the light route is short. Therefore, if a blue color pulse propagates faster than a red color pulse, the propagation delay can also be avoided by making the transmission distance of the red color pulse in a dispersion compensator shorter than that of the blue color pulse. Thus, dispersion can be compensated.

However, there is also a special need for practical inverted-dispersion component (wavelength dispersion compensator) to be used in a wavelength-division multiplex transmission system. The wavelength dispersion of a general commercially available optical fiber is not constant, but is often positively inclined (the longer a wavelength, the greater the wavelength dispersion). For example, in the case of a general single-mode fiber (SMF), wavelength dispersion per kilometer and wavelength dispersion slope per kilometer are +17 ps/nm and 0.06 ps/nm$^2$, respectively. If a necessary wavelength bandwidth is, for example, 35 nm, the wavelength dispersion changes approximately +2 ps/nm. Such an inclination of a wavelength dispersion slope is sometimes called "wavelength dispersion slope" or "secondary wavelength dispersion". The wavelength dispersion slope is not always positive (the longer a wavelength, the grater the wavelength dispersion). In a dispersion shifted fiber where zero dispersion wavelength is shifted to a wavelength band of 1.5 μm by modifying the structure dispersion of a fiber, there can be a negative wavelength dispersion slope in a wavelength band longer than the zero dispersion wavelength. In the actual wavelength dispersion of an optical fiber transmission line, both the wavelength dispersion per unit length and wavelength dispersion slope are determined by the type of optical fiber, and then both the actual wavelength dispersion and wavelength dispersion slope are determined by the length (transmission distance) of the optical fiber. To compensate for the wavelength dispersion of such an actual optical fiber transmission line by an inverted-dispersion component, first it is preferable to be able to modify a wavelength dispersion amount by some amount by a wavelength dispersion compensator. This is because both the type and transmission distance of an optical fiber vary depending on the transfer rate and wavelength band of a transmission system, the installation time of an optical fiber and the situation of the installation site. Furthermore, in the case of a wavelength-division multiplex transmission, it is not sufficient to compensate for only wavelength dispersion, as described earlier, and wavelength dispersion slope is also a problem. This is because even if dispersion can be compensated for in the wavelength of a specific signal channel, wavelength dispersion cannot be completely compensated for in the wavelength of a different signal channel if the wavelength dispersion of an inverted-dispersion component is constant. For this reason, it is preferable for an inverted-dispersion component for a wavelength-division multiplex transmission to have a wavelength dispersion slope. Furthermore, since a transmission distance varies, as described earlier, the wavelength dispersion slope changes in proportion to the length along with the wavelength dispersion. Therefore, it is preferable to be also able to modify the wavelength dispersion slope by some order. However, the value to be given to the wavelength dispersion slope is not uniquely determined by the value of the wavelength dispersion. This is because not only the wavelength dispersion, but also the wavelength dispersion slope vary depending on the type of an optical fiber.

Specifically, if in a wavelength-division multiplex transmission, the wavelength dispersion of an optical fiber transmission line is compensated for by an inverted-dispersion component, it is preferable to independently modify both the wavelength dispersion and wavelength dispersion slope. However, this method is not specifically described in Japanese Patent Laid-open Nos. 10-534450 and 11-513133. This cannot be implemented by the conventional inverted-dispersion component. First, although an index profile with an inverted-dispersion slope is available for a dispersion-compensated fiber, the method is not practical since both a variety of index profiles and a variety of lengths are needed to modify the value. As described earlier, the cost is high, loss is great and the size is excessive. In a chirp fiber grating, if the chirp of a fiber grating is optimally designed, an inverted-dispersion slope can be provided. However, since both a variety of index profiles and a variety of lengths are needed to modify the value, the method is not practical. Even if temperature is modified, both the wavelength dispersion and wavelength dispersion slope cannot be independently modified. As described earlier, a wavelength band sufficient to compensate for light, including many wavelengths, such as multi-wavelength light cannot be obtained. In the conventional diffraction grating, wavelength dispersion and a wavelength dispersion slope may be independently modified depending on the combination method of diffraction gratings. However, since as described earlier, in a fiber-optical communications system, a practical size cannot provide dispersion sufficient to compensate for a fairly large amount of chromatic dispersion caused in the fiber-optical communications system, the conventional diffraction grating is not practical. If the bit rate is further increased, compensation by the wavelength dispersion slope described above, that is, compensation by higher-order dispersion, such as tertiary dispersion may have to be made.

SUMMARY OF THE INVENTION

It is an object of the present invention to provide a wavelength dispersion compensation system for compensating for both wavelength dispersion and other higher-order wavelength dispersions, including the wavelength dispersion slope, that are simultaneously accumulated in an optical fiber in the multi-wavelength range of a multi-channel.

The wavelength dispersion compensation system of the present invention is used to compensate for wavelength dispersion which is suffering by light when being transmitted through an optical fiber. The wavelength dispersion compensation system comprises a plurality of wavelength dispersion compensation units compensating for the wavelength dispersion of each order and a connection unit sequentially passing the light through the plurality of wavelength dispersion compensation units.

According to the present invention, the wavelength dispersion of each order is compensated for by connecting each wavelength dispersion compensation units designed to compensate for the wavelength dispersion of each order and sequentially passing light which has suffered from wavelength dispersion through the wavelength dispersion compensation units. Thus, the wavelength of any order can be compensated for. In particular, by replacing the wavelength dispersion compensator with a module for simply returning light without wavelength dispersion, a wavelength dispersion compensation system for compensating for only the wavelength dispersion of a order to be compensated for can be flexibly configured without the modification of the entire configuration of the wavelength dispersion compensation system.

BRIEF DESCRIPTION OF THE DRAWINGS

FIG. 14 shows one configuration of the dispersion compensation system in the preferred embodiment of the present invention (No. 1)

DESCRIPTION OF THE PREFERRED EMBODIMENTS

The dispersion compensation system using a dispersion compensator with a VIPA plate is described below. However, the following description also applies to a dispersion compensation system using a dispersion compensator with a device having a function equivalent to that of a VIPA plate.

In the preferred embodiment of the present invention, a dispersion amount generated by a VIPA type dispersion compensator can be adjusted by designing the shape of a reflecting mirror located in the optical system of a conventional VIPA type dispersion compensator also by taking higher-order dispersion into consideration.

FIGS. 6 through 12 show how to determine the shape of the reflecting mirror of this preferred embodiment.

Light focused by a cylindrical lens is inputted to an etalon plate-like structure, the input- and output-side surfaces of which are coated so that the reflectances of the input- and output-side surfaces except for an input slit can be 100% and a percentage slightly less 100%, respectively (hereinafter called a "VIPA plate"). In this case, if an angle formed by the VIPA plate and light, and the refractive index of a VIPA plate are assumed to be $\Theta$ and n, respectively, the following equation is obtained by Snell's law (see FIG. 6).

$$\sin \Theta = n \sin \theta \quad (1)$$

Figure 1:
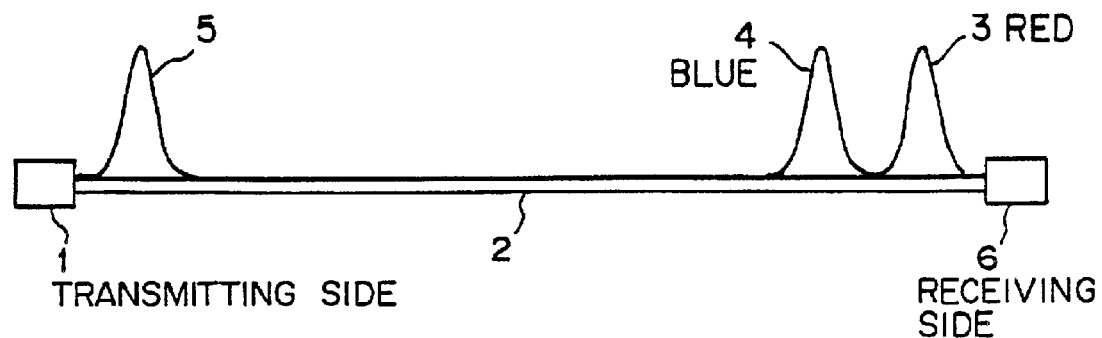
FIG. 1 shows a conventional fiber-optical communications system for transmitting information through light.
Figure 1:
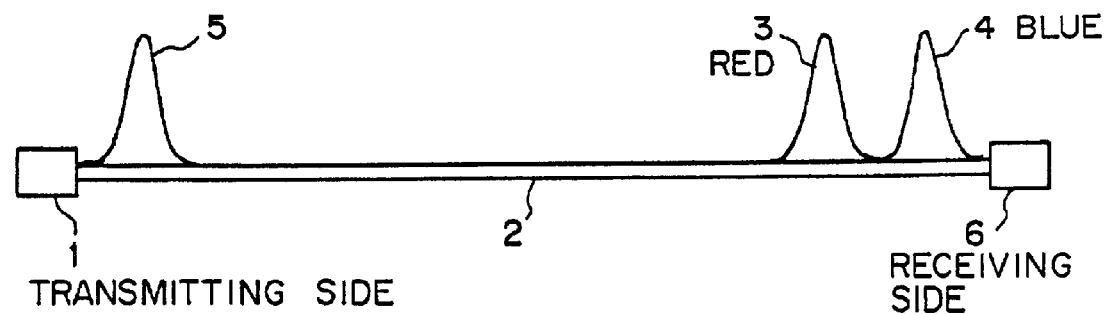
Figure 2A:
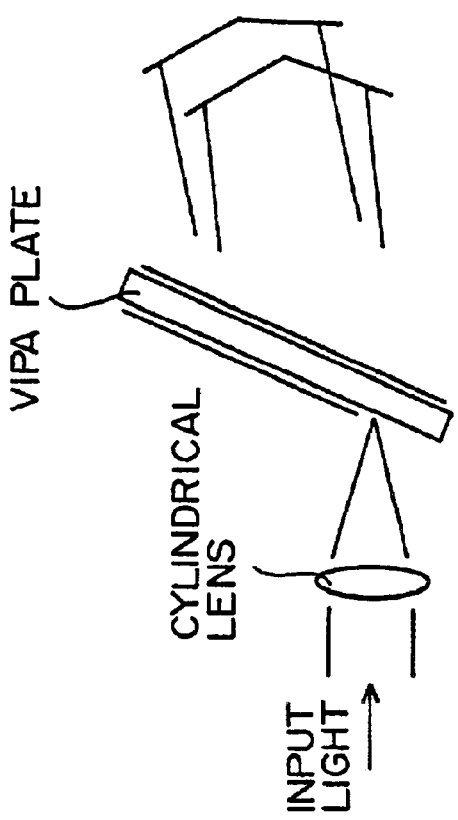
FIGS. 2A and 2B show the operation of a VIPA plate.
Figure 2B:
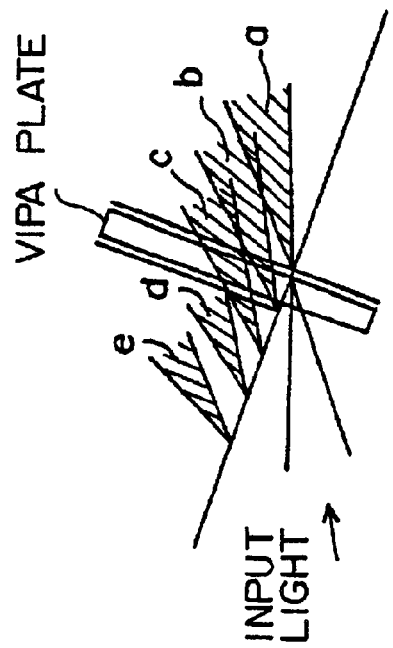
Figure 3:
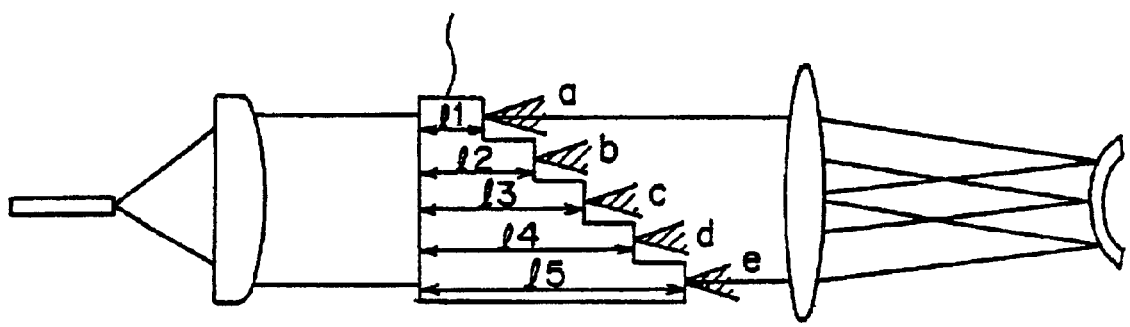
FIG. 3 shows a dispersion compensator using a transmission type diffraction grating with a function equivalent to that of a VIPA plate.
Figure 4:
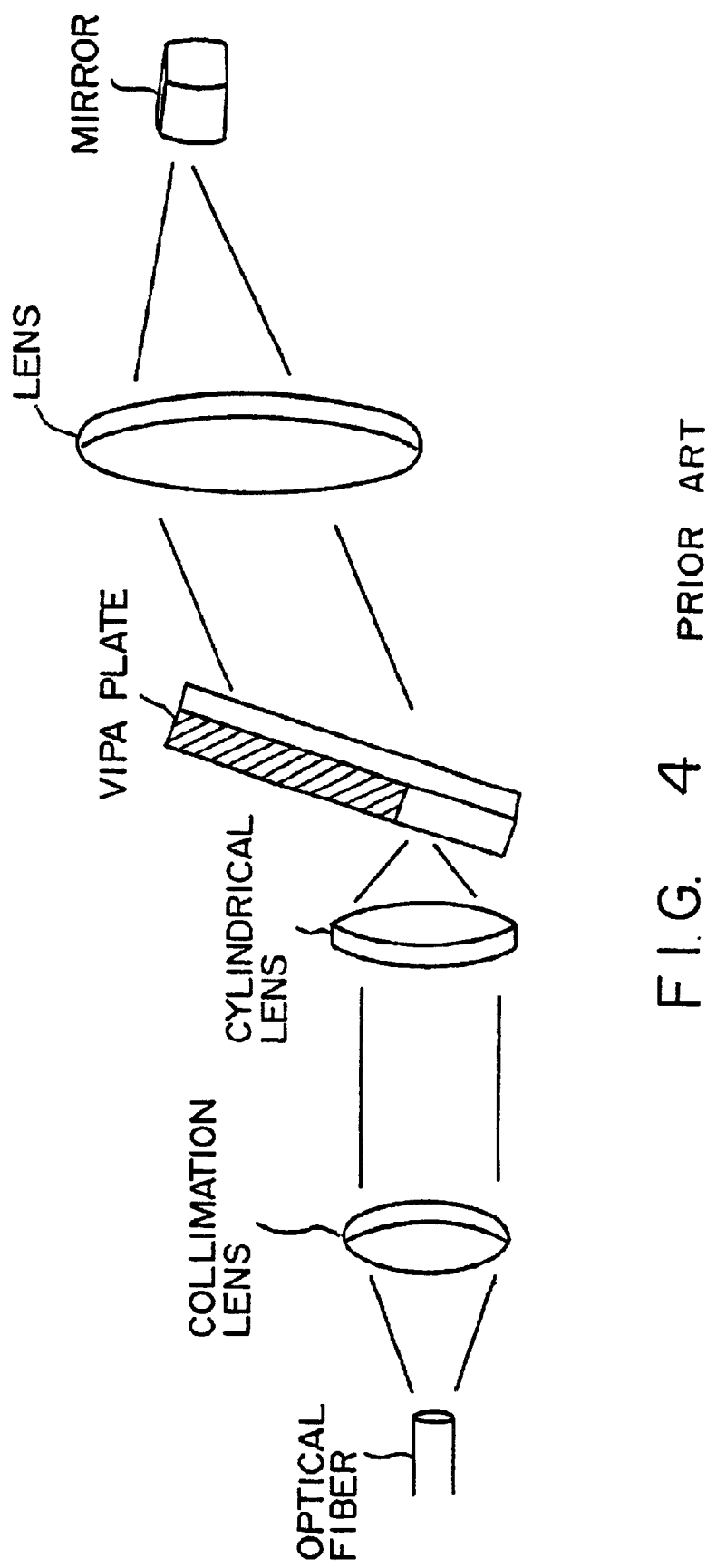
FIG. 4 shows the operational principle of a dispersion compensator using a VIPA plate (No. 1)
Figure 5:
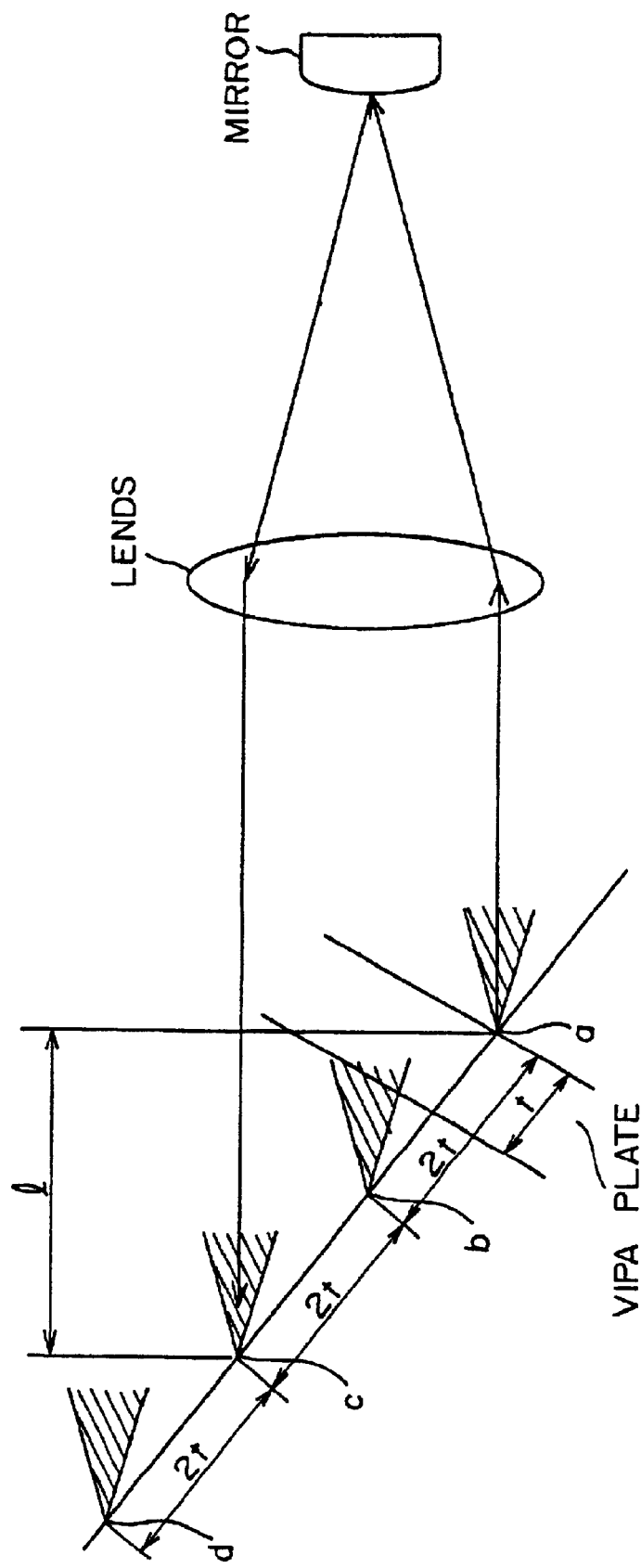
FIG. 5 shows the operational principle of a dispersion compensator using a VIPA plate (No. 2)
Figure 6:
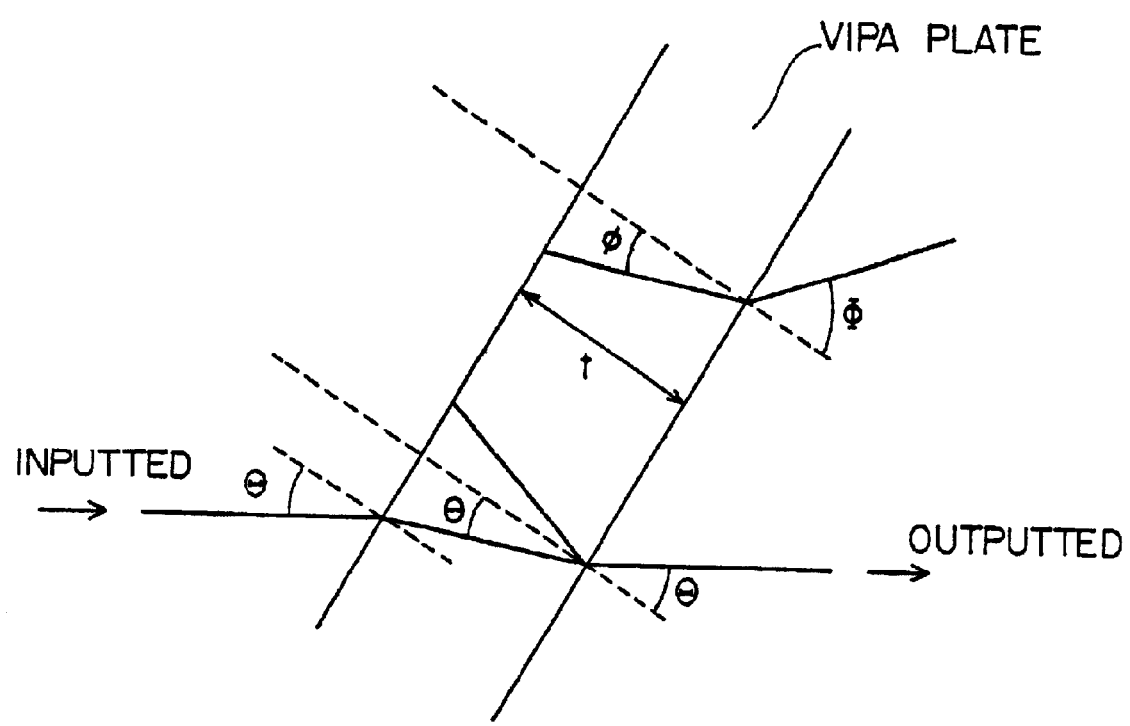
FIG. 6 shows how to determine the shape of the reflecting mirror of the present invention (No. 1)
Figure 7:
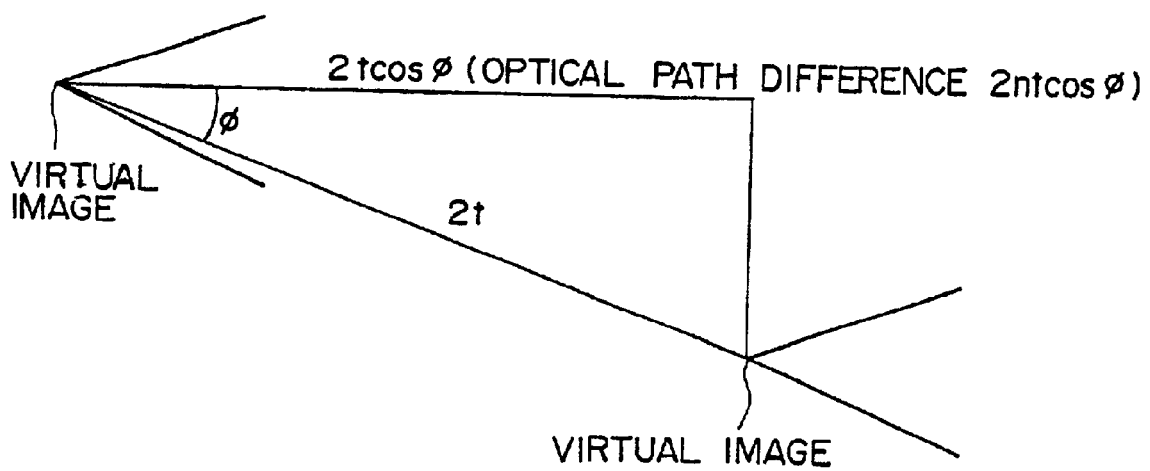
FIG. 7 shows how to determine the shape of the reflecting mirror of the present invention (No. 2)

FIG. 6 shows how light inputted to the VIPA plate is refracted, where the angle of the input light with a vertical straight line perpendicular to the VIPA plate and an angle formed by the light and vertical straight line perpendicular to the VIPA plate after the light is inputted to the VIPA plate are assumed to be $\Theta$ and $\theta$, respectively. Since both the inputted light and outputted light are outputted to the air and are inputted/outputted to the same VIPA plate, the angle formed by the light and vertical straight line perpendicular to the VIPA plate when the light is outputted, becomes the same as the angle formed by the light and vertical straight line perpendicular to the VIPA plate when the light is outputted, due to the reflection relation. In this example, the reflectance of the air and the thickness of a VIPA plate are assumed to be 1 and t, respectively.

Since the incidence angle is small, the following expression is obtained if the relation is linearly approximated.

$$\Theta \approx n\theta \quad (2)$$

The light repeats multi-reflection within the VIPA plate and propagates while expanding a beam diameter. Since this behavior of the light is equivalent to the behavior of light outputted from a transmission type stairs-shaped diffraction grating, the VIPA plate functions as a spectroscope. Since the light branched by the VIPA plate is outputted for each wavelength, Snell's law holds true if an angle expressed by the function of the wavelength obtained when the light is outputted from the VIPA plate and an angle expressed by the function of the wavelength obtained when the light stays within the VIPA plate are assumed to be $\Phi$ and $\phi$, respectively (see FIG. 6).

$$n \sin \phi = \sin \Phi \quad (3)$$

Equation (3) can be approximated like expression (2), as follows.

$$n\phi \approx \Phi \quad (4)$$

Next, if two adjacent virtual images in a virtually imaged phased array (VIPA) are focused (see FIG. 7), a condition for a plurality of light outputted through a slit reinforcing each other at infinity is obtained according to the following equation if the thickness of a VIPA plate and the number of the order are assumed to be t and m, respectively.

$$2nt \cos \phi = m\lambda \quad (5)$$

By using equation (5), angle dispersion, which is the branching function of a VIPA plate, can be obtained. The linear approximation of the angle used is obtained by the following expression.

$$d\phi \approx -\frac{1}{\phi} \cdot \frac{d\lambda}{\lambda} \quad (6)$$

Furthermore, by using expression (4), the following expression is obtained.

$$\frac{d\Phi}{d\lambda} \approx -\frac{n^2}{\lambda\Phi} \quad (7)$$

Next, delay caused by the VIPA plate is described using the differential amount of the curve of a reflecting mirror. If a coordinate axis that is provided to determine the shape of the reflecting mirror and a reflection curve are assumed to be y and c (y), respectively, the differential amount of the curve of the reflecting mirror is obtained by the following equation.

$$h(y) = \frac{dc(y)}{dy} \quad (8)$$

This h (y) corresponds to the differential amount, which is the angle of a mirror. One wavelength outputted from the VIPA plate is focused. The covered distance of the focused wavelength, from where the wavelength shifts in parallel from the output slit to where the wavelength couples to the VIPA plate, is calculated by tracing the light beam from where this beam passes through a lens to where the beam is reflected on the mirror, passes through the lens again and returns to the VIPA plate. This parallel beam shift is calculated. First, H1 and H2 are defined in FIG. 8 based on the movement of the light beam before hitting the mirror in preparation for calculating the beam shift.

$$H1=a \cdot \tan(\Phi-\Theta) \approx a(\Phi-\Theta) \quad (9)$$

$$H2=f \cdot \tan(\Phi-\Theta) - a \cdot \tan(\Phi-\Theta) \approx f(\Phi-\Theta) - a(\Phi-\Theta) \approx (f-a)(\Phi-\Theta) \quad (10)$$

Figure 8:
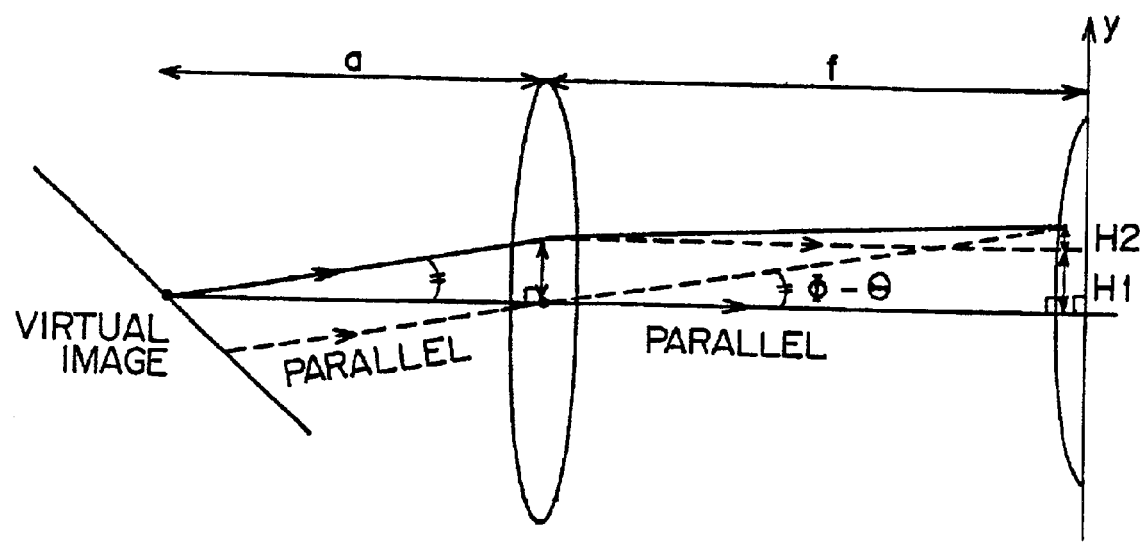
FIG. 8 shows how to determine the shape of the reflecting mirror of the present invention (No. 3)

Then, FIG. 8 is described. Dotted lines passing through the center of the lens shown in FIG. 8 are auxiliary lines. Ideally a plurality of light pass through the center of a lens as shown by these auxiliary lines, there is no refraction. However, if the plurality of light pass through points other than the center of the lens, the plurality of light are refracted and collected as shown by the solid lines when a specific wavelength is focused. In this case, if the solid and auxiliary lines on the input side are parallel, the plurality of light are collected at the same point. Thus, the angle shown in FIG. 8 is obtained, and furthermore, both H1 and H2 can be calculated according to the equations (9) and (10).

Figure 9:
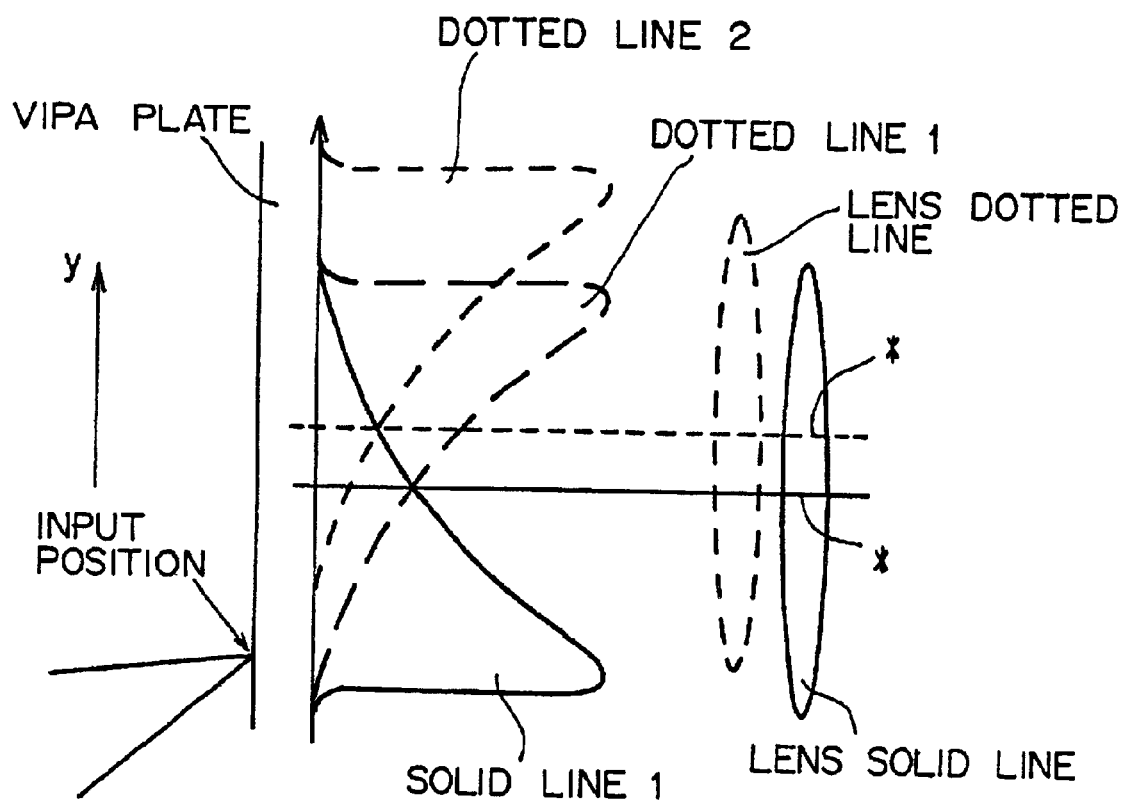
FIG. 9 shows how to determine the shape of the reflecting mirror of the present invention (No. 4)

If the refractance of the VIPA plate is uniform, the power of a beam outputted from the VIPA plate is exponentially attenuated as the beam propagates farther from the input position of the light (solid line 1 shown in FIG. 9). When this light passes a series of optical systems and couples to the VIPA plate, the light returns as an image represented by dotted line 1. Thus, an image reflected against an axis perpendicular to the center of the lens returns to the VIPA plate. For this reason, the position represented by the dotted line changes according to the location of the center of the lens in the optical system. If the center of the lens is located in the position represented by the dotted line (lens dotted line) shown in FIG. 9, the image shifts upward as shown by the dotted line (dotted line 2). Similarly, if the center of the lens is located in the position represented by the solid line (lens solid line) shown in FIG. 9, the image shifts downward as shown by the dotted line (dotted line 1). Thus, it is found that the length of a shown in FIG. 8 changes depending on the location of the lens. Specifically, if the image represented by the dotted line shifts upward, the length of a becomes long. If the image represented by the dotted line shifts downward, the length of a becomes short. The value of a can be calculated by calculating and using y obtained when T (y)*R (y) becomes a maximum if a coordinate system along the VIPA system is designated as the y axis and if a function indicating the profile of an output beam and a function indicating an image represented by the dotted line are assumed to be T (y) and R (y), respectively.

$$T(y) * R(y) = \int_{-\infty}^{\infty} T(y) \cdot R(y-\tau) d\tau \quad (11)$$

Equation (11) is the convolution integral of T (y) and R (y). This is used to calculate the overlapped part of the solid and dotted lines shown in FIG. 9. By maximizing this value, a condition for maximizing the overlapped part and coupling the returned light to the VIPA plate at the highest efficiency can be calculated.

Figure 10:
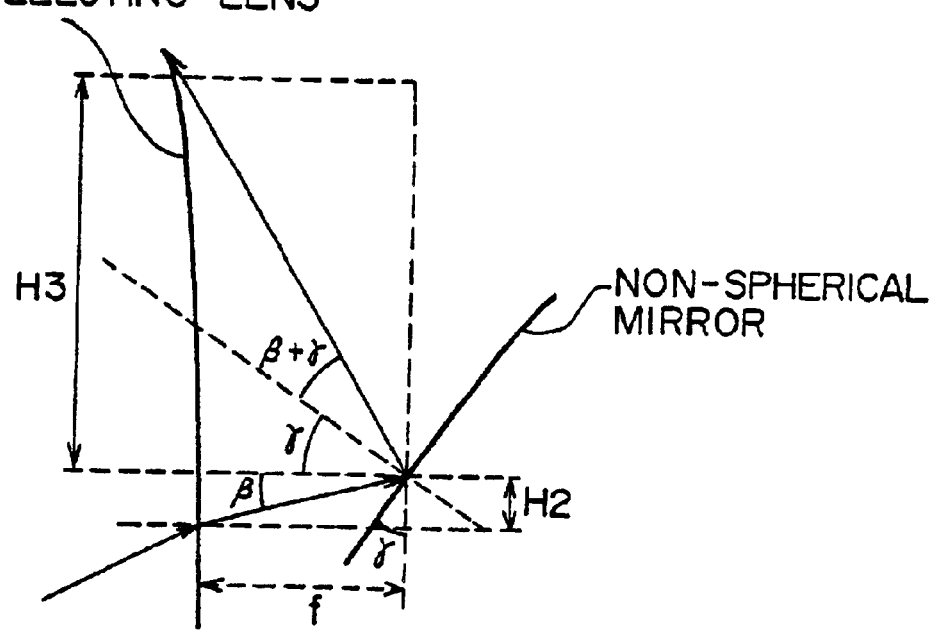
FIG. 10 shows how to determine the shape of the reflecting mirror of the present invention (No. 5)

FIG. 10 shows the preparation for calculating the locus of the light beam of reflected light by using the angle relation of the light reflected on a mirror. Thick solid lines on the left and right represent a lens and a mirror, respectively. The distance in position between the light reflected on the reflecting mirror and the light inputted to the lens is assumed to be H3. In preparation for the calculation of H3, two angles must be defined.

$$\lambda \approx \tan \lambda \approx h(y) \quad (12)$$

Furthermore, in FIG. 10, the following expression holds true.

$$\beta \approx \tan\beta = \frac{H2}{f} = \frac{(f-a) \cdot (\Phi-\Theta)}{f} \quad (13)$$

By using these two angles, H3 is calculated according to the following equation.

$$H3 = f \cdot \tan(\beta + 2\gamma) \approx f(\beta + 2\gamma) = f\left(\frac{(f-a) \cdot (\Phi-\Theta)}{f} + 2h(y)\right) \quad (14)$$

$$= (f-a)(\Phi-\Theta) + 2fh(y)$$

The position where the reflection beam from a non-spherical mirror hits the lens (see FIG. 11) is calculated according to the following equation.

$$H4=H1+H2+H3=(2f-a) \cdot (\Phi-\Theta)+2fh(y) \quad (15)$$

Thus, the beam shift is calculated according to the following equation.

$$\text{Beamshift}=H4-H1=2(f-a)(\Phi-\Theta)+2fh(y) \quad (16)$$

Figure 11:
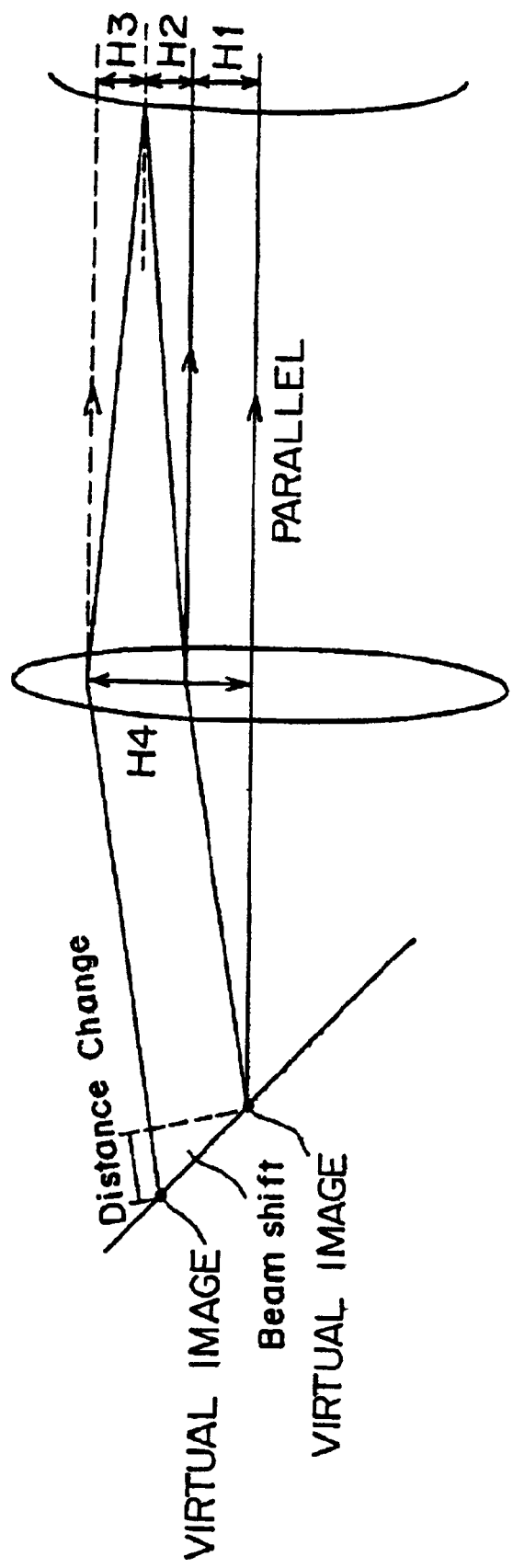
FIG. 11 shows how to determine the shape of the reflecting mirror of the present invention (No. 6)

Using this result, both delay and wavelength dispersion are calculated. The distance change expressed by a bold solid line in FIG. 11 is the difference in optical path length of light, a specific wavelength of which is focused, caused when the light returns to the VIPA plate through a series of optical systems. Since, in a real system, this difference is equal to an optical path length covered by the light from where the light is multiply reflected in the VIPA plate to where the light returns to the original output slit, the delay can be defined as follows.

$$\text{Delay} = \frac{n}{c}(\text{Distance change}) = \frac{n}{c} \cdot \frac{\text{Beam shift}}{\tan\phi} \approx \frac{n}{c} \cdot \frac{\text{Beam shift}}{\phi} \quad (17)$$

$$\approx \frac{2n^3}{c\Phi}\{2(f-a)(\Phi-\Theta) + 2fh(y)\}$$

In the above equation, c represents the speed of light. Equation (8) is also used. Since wavelength dispersion indicates a caused delay amount, wavelength dispersion can be calculated by the wavelength differential of the delay.

$$\text{Dispersion} = \frac{\partial(\text{Delay})}{\partial\lambda} \quad (18)$$

$$= \frac{2n^2}{c}\left\{(f-a)\frac{\Theta}{\Phi^2} + \frac{f}{\Phi} \cdot \frac{dh(y)}{dy} \cdot \frac{dy}{d\Phi} - \frac{fh(y)}{\Phi^2}\right\}\frac{d\Phi}{d\lambda}$$

Wavelength dispersion that is generated by a VIPA type dispersion compensator is calculated according to this equation (18). Then, equation (18) is transformed using equation (8) as follows:

$$(18) \approx -\frac{2n^4}{c\lambda\Phi^3}\left\{(f-a)\Theta + f^2\Phi\frac{dh(y)}{dy} - fh(y)\right\} \quad (19)$$

Then, the number of parameters is reduced. In FIG. 8, the following equation holds true.

$$y = f(\Phi - \Theta) \quad (20)$$

Using a polynomial, the left-hand-side of equation (18) is replaced with what is obtained by approximating the reciprocal dispersion of a wavelength dispersion characteristic caused by a fiber. If high-accuracy approximation is not required, the left term of expression (19) can also be replaced with a polynomial representing the reciprocal dispersion of a wavelength dispersion characteristic. By solving a simultaneous differential equation consisting of this differential equation (21) (in this example, it is expressed using equation (18)) and equations (20), (22) and (23), the shape of a mirror for compensating for higher-order dispersion can be determined.

$$a_0 + a_1\lambda^1 + a_2\lambda^2 + \ldots a_n\lambda^n = \quad (21)$$
$$\frac{2n^2}{c}\left\{(f-a)\frac{\Theta}{\Phi^2} + \frac{f}{\Phi} \cdot \frac{dh(y)}{dy} \cdot \frac{dy}{d\Phi} - \frac{fh(y)}{\Phi^2}\right\}\frac{d\Phi}{d\lambda}$$

$$d\left(\frac{\Phi}{n}\right) = -\cot\left(\frac{\Phi}{n}\right) \cdot \frac{d\lambda}{\lambda} \quad (22)$$

$$2nt\cos\left(\frac{\Phi}{n}\right) = m\lambda \quad (23)$$

In equations (21) and after, the same symbol n is used for the highest order obtained by developing a dispersion compensation amount by the power of a wavelength and the reflectance of the VIPA plate, so that a person having ordinary skill in the art would not be confused by nomenclature.

If equation (21) can be replaced with expression (19) in terms of accuracy, calculation can be simplified by using expression (7) obtained by approximating equation (22). As described earlier, a series of ways of thinking, described above, also applies to a transmission type diffraction grating, which can be used instead of the VIPA plate. For example, if up to tertiary dispersion is needed, the simultaneous differential equation can be solved as a polynomial of up to n=2. By solving this simultaneous equation, a shape for compensating even for higher-order dispersion can be obtained. In this case, if compensation for abroad band, such as, a C-band or an L-band, is needed as in the case of a dispersion slope, such a shape can be implemented by using a transmission type diffraction grating equivalent to a virtual image generated by a VIPA plate instead of the VIPA plate. The left-hand-side of equation (21) can be decomposed as follows.

$$a_0 = \frac{2n^2}{c}\left\{(f-a)\frac{\Theta}{\Phi^2} + \frac{f}{\Phi} \cdot \frac{dh_0(y)}{dy} \cdot \frac{dy}{d\Phi} - \frac{fh_0(y)}{\Phi^2}\right\}\frac{d\Phi}{d\lambda} \quad (24)$$

$$a_1\lambda^1 = \frac{2n^2}{c}\left\{(f-a)\frac{\Theta}{\Phi^2} + \frac{f}{\Phi} \cdot \frac{dh_1(y)}{dy} \cdot \frac{dy}{d\Phi} - \frac{fh_1(y)}{\Phi^2}\right\}\frac{d\Phi}{d\lambda}$$

$$\ldots$$

$$a_{n-1}\lambda^{n-1} = \frac{2n^2}{c}\left\{(f-a)\frac{\Theta}{\Phi^2} + \frac{f}{\Phi} \cdot \frac{dh_{n-1}(y)}{dy} \cdot \frac{dy}{d\Phi} - \frac{fh_{n-1}(y)}{\Phi^2}\right\}\frac{d\Phi}{d\lambda}$$

$$a_n\lambda^n = \frac{2n^2}{c}\left\{(f-a)\frac{\Theta}{\Phi^2} + \frac{f}{\Phi} \cdot \frac{dh_n(y)}{dy} \cdot \frac{dy}{d\Phi} - \frac{fh_n(y)}{\Phi^2}\right\}\frac{d\Phi}{d\lambda}$$

By a solution for a simultaneous differential equation consists of these equations and equations (20), (22) and (23), each mirror shape for compensating for wavelength dispersion of each order can be determined. Specifically, a mirror shape can be obtained for each dispersion value of order to be compensated. Specifically, if a mirror shape is determined using the first equation of equation (24), a mirror for compensating for primary wavelength dispersion. Similarly, by using the second equation, secondary dispersion can be compensated for. Thus, respective mirror shapes for compensating for up to wavelength dispersion up to (n+1) order can be obtained. This n can be infinitely increased. However, in that case, a dispersion compensation amount represented by the left-hand-side of equation (21) must be set so that the wavelength dispersion characteristic of an optical fiber can be sufficiently compensated for.

By directly connecting VIPA type dispersion compensators (including dispersion compensators using a transmission type diffraction grating instead of a VIPA plate) equipped with a mirror using an optical circulator and the like, higher-order dispersion compensation can be implemented (see FIG. 14, which is described later). Furthermore, this circuit can select a dispersion order to be compensated. The coefficient expressed by a polynomial varies depending on an optical fiber transmission distance. Although in the above description, a dispersion amount to be compensated is expressed as the polynomial of a wavelength, the dispersion characteristic of an optical fiber can be more accurately expressed by a dispersion amount using Chebyshev's polynomials since Chebyshev's polynomials are orthogonal functions. Thus, the accuracy of a mirror can be improved. However, since Chebyshev's polynomials are defined and normalized within the variable range of 0 to 1, a specific coefficient must be multiplied to convert Chebyshev's polynomials into the differential equation. Alternatively, a dispersion amount to be compensated can be expressed using other functions which constitute an orthogonal function system instead of Chebyshev's polynomials.

Figure 12:
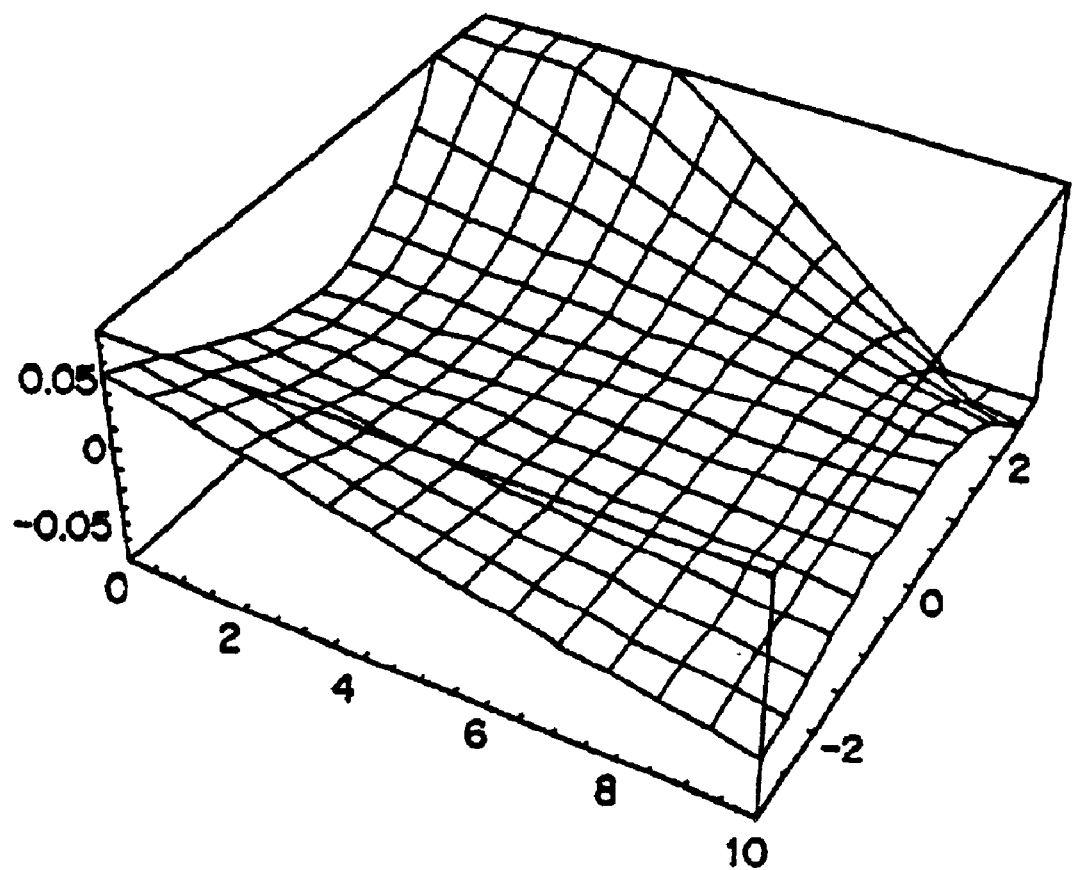
FIG. 12 shows the surface shape of the reflecting mirror obtained by solving an equation using a wavelength dispersion compensation amount expressed by a polynomial so that primary wavelength dispersion can be kept constant within one wave band (No. 1)
Figure 13:
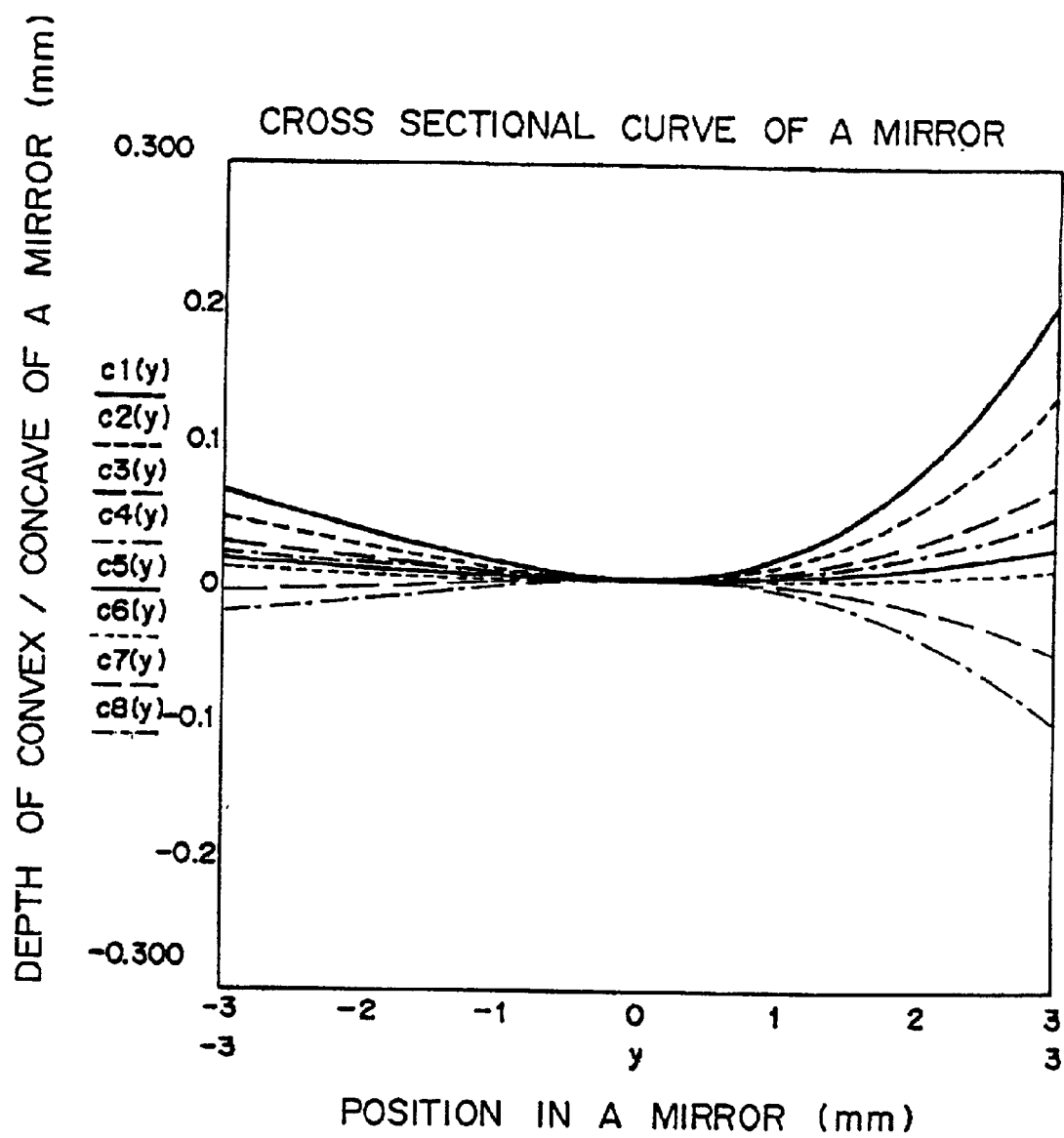
FIG. 13 shows the surface shape of the reflecting mirror obtained by solving an equation using a wavelength dispersion compensation amount expressed by a polynomial so that primary wavelength dispersion can be kept constant within one wave band (No. 2)

FIGS. 12 and 13 show the surface shape of a reflecting mirror obtained by solving a polynomial in which primary wavelength dispersion is constant in one wave band, using a wavelength dispersion compensation amount as a constant.

As seen from FIG. 12, the mirror shape is non-spherical. A VIPA plate and a reflecting mirror are located in a space so that the angluar dispersion of the VIPA plate will be parallel to this cross section. However, since in the direction perpendicular to the cross section, light is focused depending on a lens instead of wavelength, much length is not needed in the direction perpendicular to the cross section. Furthermore, in the preferred embodiment of the present invention, to provide a plurality of different wavelength dispersions, a three-dimensional non-spherical mirror is used such that the shape gradually changes in the direction perpendicular to the angluar dispersion direction of a VIPA plate. FIG. 13 shows the cross section.

As shown in FIG. 12, as a given dispersion value shifts from negative to positive, the surface shape of the reflecting mirror changes from convex to concave. At a zero dispersion value, the shape is almost flat. Given wavelength dispersion varies depending on the position that light angluar-dispersed from the VIPA plate hits such a three-dimensional non-spherical mirror. Such a three-dimensional non-spherical mirror can be easily produced by an existing processing technology. Specifically, such a three-dimensional non-spherical mirror can be produced by processing a metal, such as aluminum, brass and the like with a precise three-dimensional processing machine equipped with both a single-point tool made of diamond and a precise movable stage. Since a mirror cut and processed thus is generally expensive, the mirror is produced by producing a metal mold with the inverted shape of the required shape, copying and forming the metal mold using plastics, low-melting-point glass, sol-gel glass or the like and forming the metal film of gold, aluminum, etc., or a conductive multi-layer film on a mirror. Alternatively, such a three-dimensional shape can be obtained using both ion beam etching and resists of different thicknesses. Furthermore, to actually make wavelength dispersion variable, means for making the three-dimensional non-spherical mirror movable in the direction perpendicular to the angle dispersion direction of a VIPA plate is needed. Specifically, the preferred embodiment of the present invention comprises a means for making the three-dimensional non-spherical mirror movable in the direction perpendicular to the angluar dispersion direction of a VIPA plate. The means can be mainly constituted, for example, by both a linear slider, and a motor and the like. Alternatively, the means can be constituted using a fine-motive mount and an actuator instead of the linear slider and motor, respectively. The means is not limited to these. Thus, a mirror for enabling higher-order dispersion compensation can be designed. If the higher-order dispersion compensation for all the wavelengths covering a broad band, such as a C-band and a L-band, is made by one mirror, it is recommended to organize an optical system using a transmission type diffraction grating equivalent to a VIPA plate instead of the VIPA plate since the VIPA plate has a restriction of thickness. If dispersion values of different orders are separately processed, it is recommended to form an optical circuit in which a plurality of VIPA type dispersion compensators equipped with a mirror obtained by solving a series of equations (20) to (23) are directly connected using optical circulators and the like. Loss cannot be completely eliminated if such an optical system is used. In that case, it is recommended to connect an optical amplifier as required.

Figure 15:
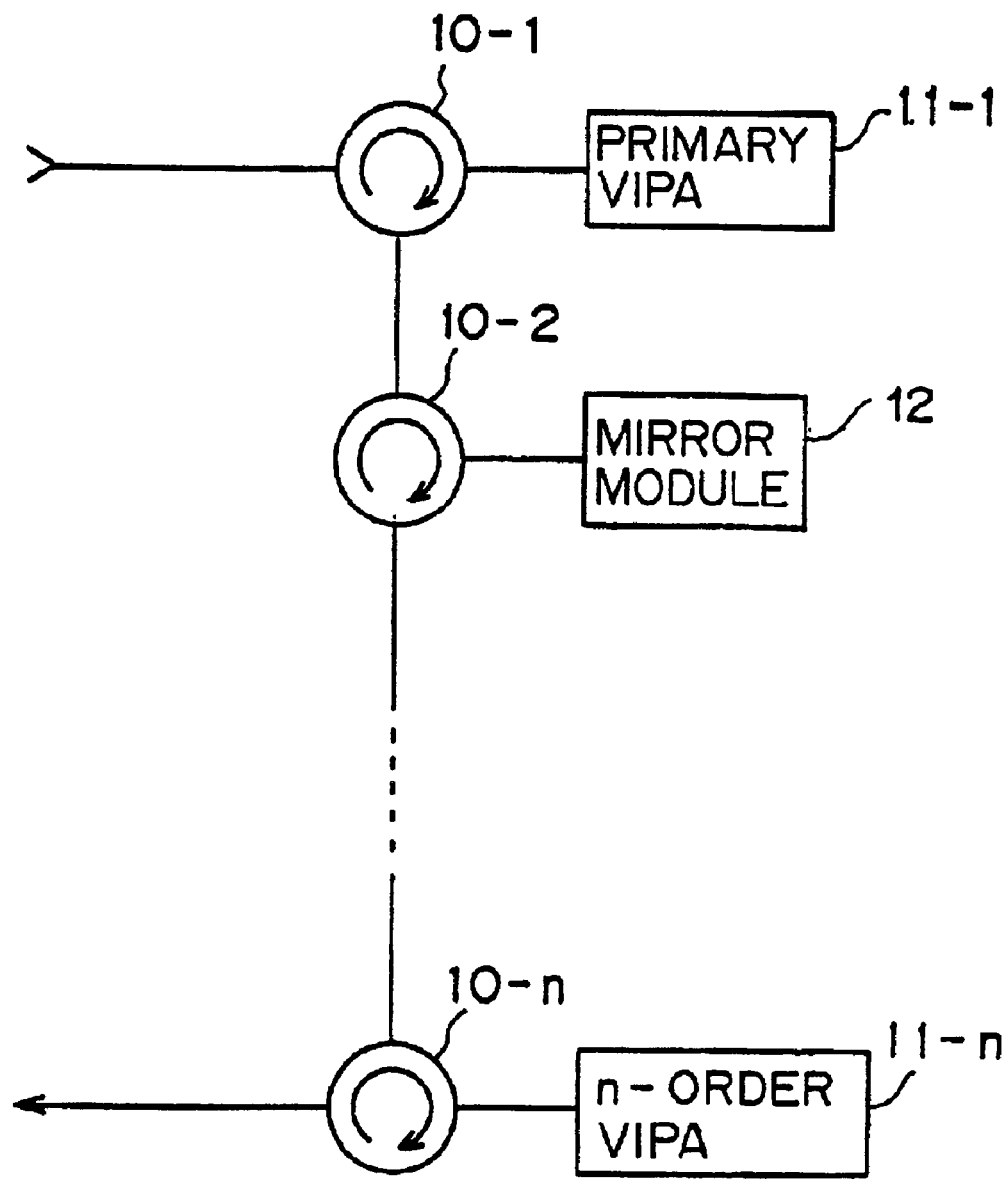
FIG. 15 shows one configuration of the dispersion compensation system in the preferred embodiment of the present invention (No. 2).

FIGS. 14 and 15 show examples of the dispersion compensation system in the preferred embodiment of the present invention.

FIG. 14 shows one configuration of a dispersion compensation system in the preferred embodiment of the present invention. A plurality of VIPA type dispersion compensators 11-1 to 11-$n$ are connected by a plurality of optical circulators 10-1 to 10-$n$. Input light is sequentially inputted to the VIPA type dispersion compensators 11-1 to 11-$n$ by the optical circulators 10-1 ... and is outputted from the optical circulator 10-$n$. Each of the VIPA type dispersion compensators 11-1 to 11-$n$ can be a dispersion compensator using a VIPA plate or a dispersion compensator using a transmission type diffraction grating performing an operation equivalent to the VIPA plate. Each of the VIPA type dispersion compensators 11-1 to 11-$n$ is configured so as to compensate for dispersion of each order according to equation (24). Specifically, the VIPA type dispersion compensators 11-1, 11-2 and 11-$n$ compensate for primary dispersion, secondary dispersion and n-order dispersion, respectively. To compensate for a plurality of dispersions of each order, the reflection plane of a non-spherical mirror provided in a VIPA type dispersion compensator is designed according to equation (24).

Thus, wavelength dispersion of any order can be compensated. Since a plurality of dispersions of each order are separately compensated for by different VIPA type wavelength dispersion compensators, the shape of the non-spherical mirror of each VIPA type wavelength dispersion compensator is prevented from being complex and each non-spherical mirror can be easily produced.

FIG. 15 shows one configuration obtained by modularizing the VIPA type wavelength dispersion compensator shown in FIG. 14.

In FIG. 15, the VIPA type wavelength dispersion compensators 11-1 to 11-$n$ are connected by the optical circulators 10-1 to 10-$n$ as shown in FIG. 14. However, depending on the environment in which an optical communications system is used, there may be no need to compensate for wavelength dispersion of a specific order. In this case, although the VIPA type wavelength dispersion compensators 11-1 to 11-$n$ are connected by the optical circulators 10-1 to 10-$n$, a VIPA type wavelength dispersion compensator of orders not to be compensated can be removed as required. Then, a mirror module 12 equipped with a flat mirror simply reflecting inputted light without modifying the optical axis is fixed to a connector from which a VIPA type wavelength dispersion compensator is removed. Thus, a dispersion compensation system for compensating for only wavelength dispersion of a desired order can be organized.

According to the present invention, the VIPA type dispersion compensation system in the preferred embodiment of the present invention can compensate for higher-order dispersion that is expected to occur when an optical pulse becomes narrow in a time axis regime due to a future increase of a bit rate.

What is claimed is:

1. A wavelength dispersion compensation system for compensating wavelength dispersion from which light suffers from being transmitted through an optical fiber, comprising:

a plurality of wavelength dispersion compensation units, each compensating for a wavelength dispersion of different order; and a connection unit sequentially passing the light through the plurality of wavelength dispersion compensation units.

2. The wavelength dispersion compensation system according to claim 1, wherein at least one of the plurality of wavelength dispersion compensation units can be replaced with at least one returning unit returning the light without wavelength dispersion compensation.

3. The wavelength dispersion compensation system according to claim 1, wherein a returning unit is provided with a mirror set to return inputted light without modifying an optical axis of the light.

4. The wavelength dispersion compensation system according to claim 1, wherein said connection unit is provided with an optical circulator.

5. The wavelength dispersion compensation system according to claim 1, wherein each of said plurality of wavelength dispersion compensation units further comprises a VIPA plate and a reflecting mirror causing transmission delay of light outputted from the VIPA plate by returning the light to the VIPA plate.

6. The wavelength dispersion compensation system according to claim 1, wherein each of said plurality of wavelength dispersion compensation units comprises a transmission type diffraction grating and a reflecting mirror causing transmission delay of light outputted from the transmission type diffraction grating by returning the light to the transmission type diffraction grating.

7. The wavelength dispersion compensation system according to claim 5, wherein a shape of a reflection surface of the reflecting mirror is determined by solving both a first equation for representing a wavelength dispersion characteristic obtained by expressing a slope of the reflection surface with a differential amount and tracing light outputted from the VIPA plate from where the light is reflected on the reflection plane to where the light couples to the VIPA plate again and a second equation obtained by assigning a fact that the inverted characteristic of wavelength dispersion characteristic to be compensated is equal to what is expressed by a function having a wavelength as a variable.

8. The wavelength dispersion compensation system according to claim 6, wherein a shape of a reflection surface of the reflecting mirror is determined by solving both a first equation for representing a wavelength dispersion characteristic obtained by expressing a slope of the reflection surface with a differential amount and tracing light outputted from the transmission type diffraction grating from where the light is reflected on the reflection plane to where the light couples to the transmission type diffraction grating again and a second equation obtained by assigning a fact that the inverted characteristic of wavelength dispersion characteristic to be compensated is equal to what is expressed by a function having a wavelength as a variable.

9. The wavelength dispersion compensation system according to claim 1, wherein said connection unit receives the light from at least one preceding wavelength dispersion compensation unit and supplies the light to at least one succeeding wavelength dispersion compensation unit.

* * * * *